United States Patent
Longtin et al.

(10) Patent No.: US 6,776,455 B2
(45) Date of Patent: Aug. 17, 2004

(54) PASSENGER SEAT AND ARMREST PIVOT COVER FOR PASSENGER SEAT

(75) Inventors: Scott Longtin, Torrington, CT (US); John Williamson, Burlington, CT (US)

(73) Assignee: B E Aerospace, Wellington, FL (US)

( * ) Notice: Subject to any disclaimer, the term of this patent is extended or adjusted under 35 U.S.C. 154(b) by 4 days.

(21) Appl. No.: 10/211,087

(22) Filed: Aug. 2, 2002

(65) Prior Publication Data

US 2004/0021349 A1 Feb. 5, 2004

(51) Int. Cl.$^7$ .............................................. A47C 31/00
(52) U.S. Cl. ............................... 297/217.3; 297/411.36; 297/115
(58) Field of Search .............................. 297/217.3, 115, 297/411.2, 411.26, 411.3, 411.32, 411.45, 411.38, 248, 232

(56) References Cited

U.S. PATENT DOCUMENTS

| | | | |
|---|---|---|---|
| 4,099,780 A | * | 7/1978 | Schmidhuber |
| 4,229,040 A | | 10/1980 | Howell et al. |
| 4,577,905 A | * | 3/1986 | Grant |
| 4,938,534 A | | 7/1990 | Tornero |
| 5,186,520 A | * | 2/1993 | Whitaker et al. |
| 5,195,709 A | * | 3/1993 | Yasushi .................... 248/280.1 |
| 5,390,976 A | * | 2/1995 | Doughty et al. ............ 297/115 |
| 5,746,480 A | | 5/1998 | Bonutti |
| 5,795,018 A | | 8/1998 | Schumacher et al. |
| 5,795,025 A | | 8/1998 | Murphy |
| 5,823,624 A | * | 10/1998 | Dahlbacka ............. 297/411.36 |
| 5,839,136 A | | 11/1998 | Vance et al. |
| 5,865,503 A | * | 2/1999 | Shields, Jr. ............ 297/188.14 |
| 6,140,584 A | | 10/2000 | Baldissara |
| 6,206,462 B1 | | 3/2001 | Huang |
| 6,213,546 B1 | | 4/2001 | Malusev et al. |
| 6,283,551 B1 | * | 9/2001 | Bergin ................... 297/411.35 |
| 6,318,680 B1 | | 11/2001 | Benedict et al. |

* cited by examiner

*Primary Examiner*—Peter M. Cuomo
*Assistant Examiner*—Stephen Vu
(74) *Attorney, Agent, or Firm*—Adams Evans P.A.

(57) ABSTRACT

An armrest for a passenger seat includes an armrest support for being pivotally-mounted to a seat frame for movement between a lowered position and a raised position. The armrest support defines a void for carrying wiring and cabling and an opening adjacent the pivoting end of the armrest for permitting access to the interior of the armrest support. An armrest pivot cover is provided for normally being received in and covering the opening of the armrest support to protect the wiring and cabling. The armrest pivot cover includes a pivoting cylindrical member mounted for pivotal movement in a socket for a predetermined range of pivotal movement relative to the armrest support. A flexible hinge is carried by the pivoting cylindrical pivoting member for permitting further movement of the lower armrest cover past the partially-open position to a fully-open position thereby exposing fully the wiring for installation or service access.

21 Claims, 6 Drawing Sheets

PASSENGER SEAT AND ARMREST PIVOT COVER FOR PASSENGER SEAT

TECHNICAL FIELD AND BACKGROUND OF THE INVENTION

This invention relates to a passenger seat, and more particularly to an armrest pivot cover for a passenger seat. As described below, the invention has application in relation to aircraft passenger seats, and particularly to coach class passenger seats and seat sets having armrests that are pivotable between a lowered use position and a raised position between adjacent seats. This raised position may be for the purpose of providing unimpeded access to an occupied or unoccupied adjacent seat, or in order to gain access to the interior of the armrest. Electrical wiring and seat adjustment cabling are typically found in this type of armrest and must exit the armrest at the proximal end.

The armrest is typically pivoted by attachment between an armrest mounting bracket and a pivot mechanism carried by the seat frame. This can create a scissor-like action, so the pivot location is designed to protect the passenger's hands and fingers from injury during movement of the armrest. In addition, the wires and cables traveling to the armrest must be routed in such manner that they are not in intimate contact with metal components of the seat frame. The armrest pivot cover according to the invention performs both the function of covering the pivot area of the armrest and guiding wires and cables properly through this area.

SUMMARY OF THE INVENTION

Therefore, it is an object of the invention to provide a passenger seat that includes an armrest pivot cover that covers the pivot area of the armrest.

It is another object of the invention to provide a passenger seat that includes an armrest pivot cover that provides a guide for guiding wires and cables to the armrest.

It is another object of the invention to provide a passenger seat that includes an armrest pivot cover that flexes during movement in order to reduce fatigue on the flexing parts.

It is another object of the invention to provide a passenger seat that includes an armrest pivot cover that offers protection to a seat occupant from the hinge area of the seat and armrest during armrest movement.

It is another object of the invention to provide a passenger seat that includes an armrest that facilitates access to the armrest hinge and wires and cables passing through the hinge area into the armrest.

It is another object of the invention to provide a armrest pivot cover for an aircraft passenger seat that performs the functions set out above.

These and other objects of the present invention are achieved in the preferred embodiments disclosed below by providing an armrest for a passenger seat of the type carrying electrical wires and seat position cables therein. The armrest includes an armrest support for being pivotally-mounted by a support pivot on a proximal end thereof to a seat frame for movement between a lowered position for supporting a seat occupant's arm and a raised position. The armrest support has an upper wall, opposed side walls, a lower wall defining a void for carrying wiring and cabling therein towards a distal end of the upper armrest support, and an opening adjacent the proximal pivoting end of the armrest for permitting access to the support pivot. An armrest pivot cover is provided for normally being received in and covering the opening of the armrest support adjacent the proximal pivoting end thereof to protect the wiring and cabling therein. The armrest pivot cover includes a first pivot member carried adjacent a proximal end of the lower armrest cover in mating relation to a complementary second pivot member carried by the seat for a predetermined range of pivotal movement relative to the armrest support between a normally closed position covering the void in the armrest support and a partially-open position. A hinge formed of a flexible material is carried by the first pivot member for permitting further movement of the lower armrest cover past the partially-open position to a fully-open position thereby exposing fully the wiring for installation or service access.

According to one preferred embodiment of the invention, the first pivot member comprises a male member having a circular periphery and the complementary second pivot member comprises a female member within which the male member is positioned for pivotal movement.

According to another preferred embodiment of the invention, the male member comprises a cylinder and the complementary female member comprises a socket.

According to yet another preferred embodiment of the invention, the socket is carried by the seat frame.

According to yet another preferred embodiment of the invention, the armrest support is removably mounted on the seat frame for sliding movement along a longitudinal axis thereof into and out of pivoting position on the seat frame.

According to yet another preferred embodiment of the invention, the opposed side walls of the armrest support includes guide means formed on interior walls thereof for guiding the pivot cover into covering position in the opening of the armrest support.

According to yet another preferred embodiment of the invention, the guide means comprise first and second opposed guide tabs formed in respective opposed side wall and projecting into the void in a position to guide the armrest support onto the pivot cover.

According to yet another preferred embodiment of the invention, wiring guide slots are formed in the pivot cover for guiding wiring and cabling from the armrest support to the seat frame.

According to yet another preferred embodiment of the invention, one-way wire retainers are provided for allowing passage of wires or cables to pass unimpeded into the pivot cover but not unimpeded out of the pivot cover.

According to yet another preferred embodiment of the invention, an armrest for a passenger seat of the type carrying electrical wires and seat position cables therein is provided, and comprises an armrest support for being pivotally-mounted by a support pivot on a proximal end thereof to a seat frame for movement between a lowered position for supporting a seat occupant's arm and a raised position, the armrest support having an upper wall, opposed side walls, a lower wall defining a void for carrying wiring and cabling therein towards a distal end of the upper armrest support, and an opening adjacent the proximal pivoting end of the armrest for permitting access to the armrest support pivot, wiring and cabling. An armrest pivot cover is provided for normally being received in and covering the opening of the armrest support adjacent the proximal pivoting end thereof to protect the wiring and cabling therein. The lower armrest cover includes a cylindrical male pivot carried adjacent a proximal end of the lower armrest cover in mating relation to a complementary female socket pivot carried by the seat frame for a predetermined range of pivotal movement relative to the armrest support between a normally closed position covering the void in the armrest support and a partially-open position. An elastomeric hinge extends outwardly from the cylindrical male pivot for permitting further movement of the lower armrest cover past the partially-open position to a fully-open position thereby exposing fully the wiring for installation or service access.

According to yet another preferred embodiment of the invention, a passenger seat of the type having at least one armrest carrying electrical wires and seat position cables therein comprises an armrest support for being pivotally-mounted by a support pivot on a proximal end thereof to a seat frame of the seat for movement between a lowered position for supporting a seat occupant's arm and a raised position. The armrest support has an upper wall, opposed side walls, a lower wall defining a void for carrying wiring and cabling therein towards a distal end of the upper armrest support, and an opening adjacent the proximal pivoting end of the armrest for permitting access to the armrest support pivot, wiring and cabling.

An armrest pivot cover is provided for normally being received in and covering the opening of the armrest support adjacent the proximal pivoting end thereof to protect the wiring and cabling therein. The lower armrest cover includes a cylindrical male pivot carried adjacent a proximal end of the lower armrest cover in mating relation to a complementary female socket pivot carried by the seat frame for a predetermined range of pivotal movement relative to the armrest support between a normally closed position covering the void in the armrest support and a partially-open position. An elastomeric hinge extends outwardly from the cylindrical male pivot for permitting further movement of the lower armrest cover past the partially-open position to a fully-open position thereby exposing fully the wiring for installation or service access.

According to yet another preferred embodiment of the invention, the passenger seat is grouped with one or more like passenger seats to form a seat set.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF THE PREFERRED EMBODIMENT AND BEST MODE

Figure 1:
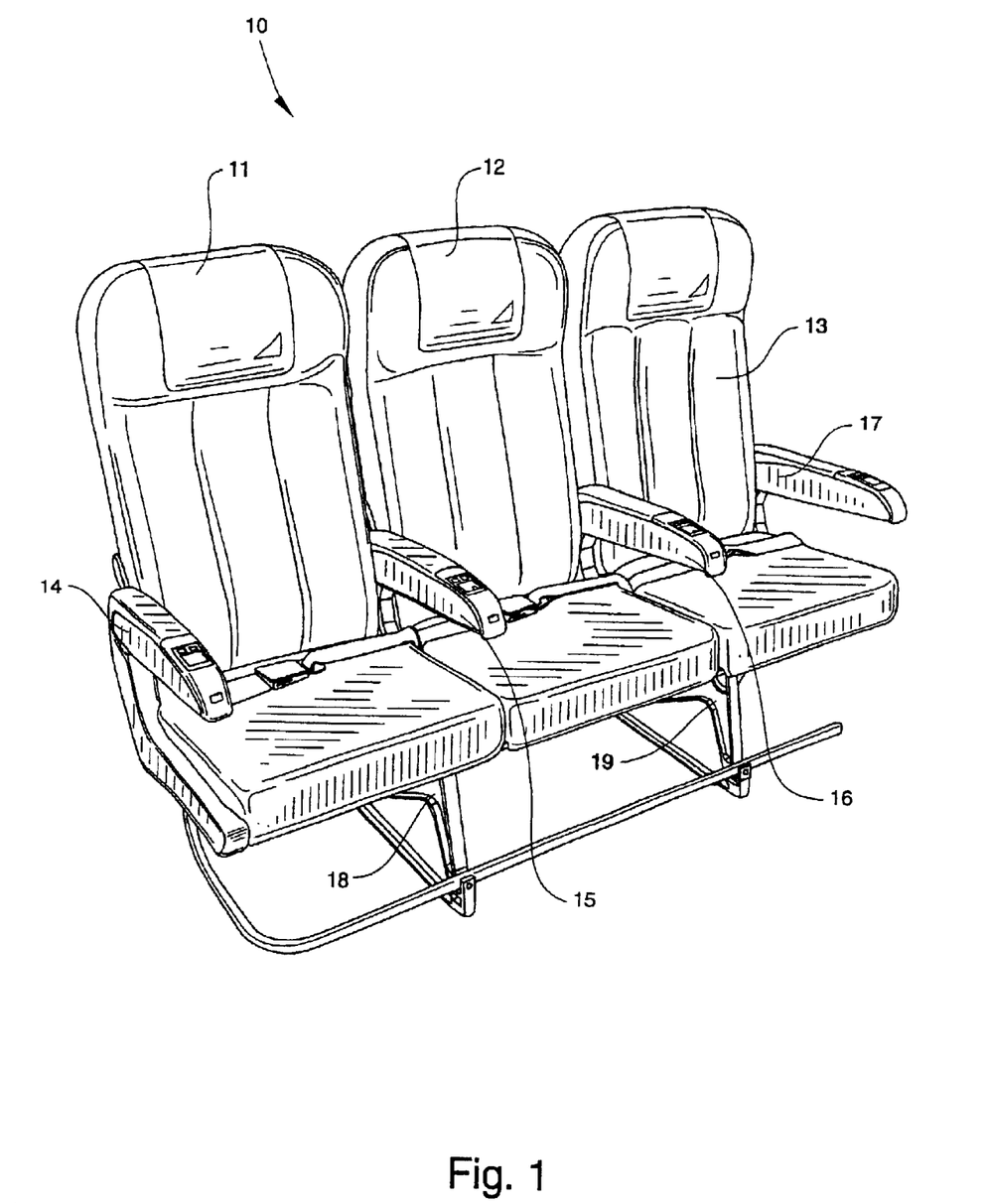
FIG. 1 is a perspective view of a coach class seat set according to an embodiment of the invention.

Referring now specifically to the drawings, a aircraft passenger seat set according to the present invention is illustrated in FIG. 1 and shown generally at reference numeral 10. The seat set 10 includes three seats 11, 12 and 13 which are collectively provided with four arm rests 14, 15, 16 and 17, each shown in the lowered passenger use position. The seats 11, 12 and 13 are supported by legs 18 and 19 mounted to the deck of the aircraft by track fittings, such as those disclosed in applicant's U.S. Pat. Nos. 5,169,091, 5,178,346 or 5,861,318.

Figure 2:
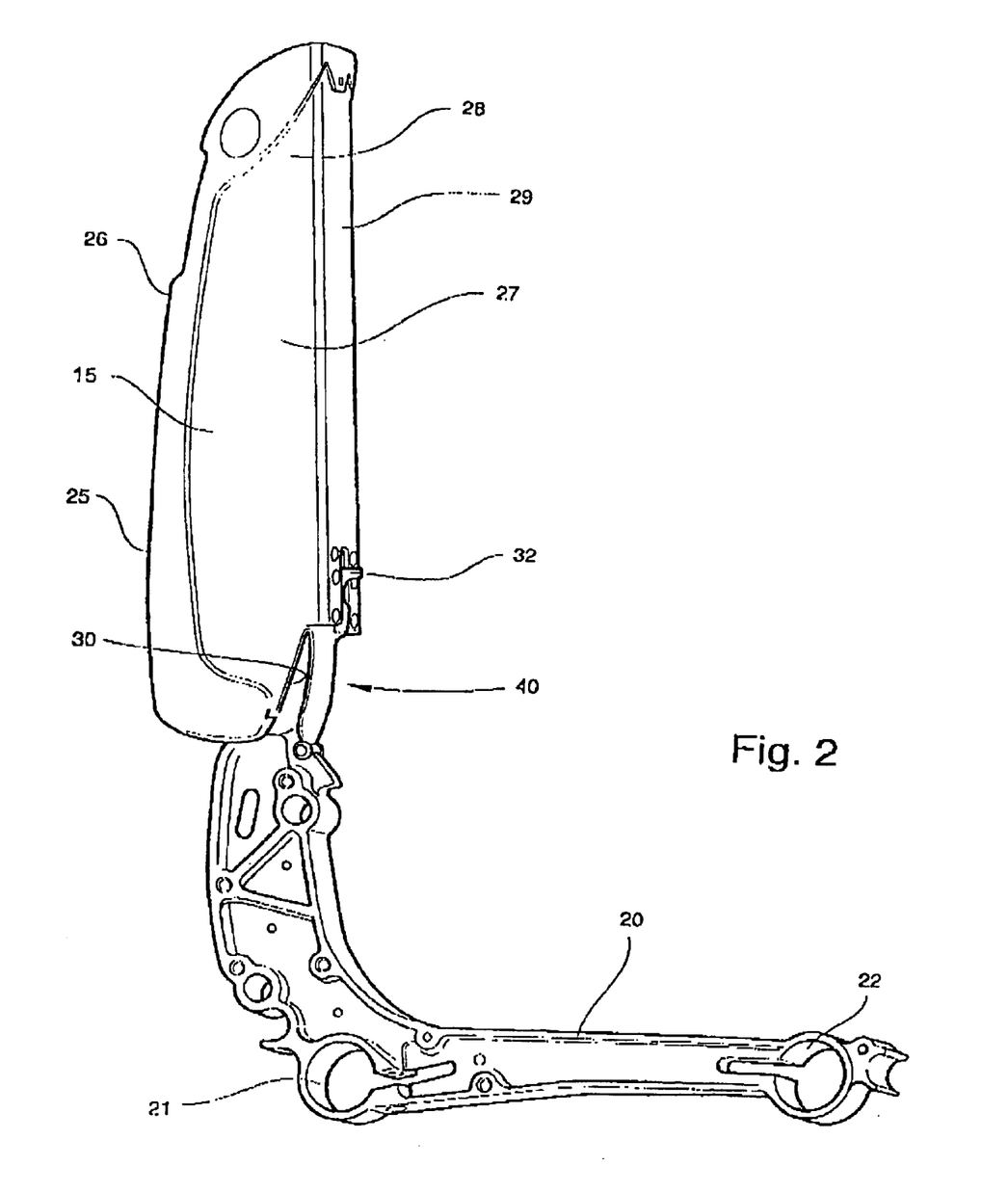
FIG. 2 is a perspective view of a seat frame with an armrest in its raised position carried thereon.
Figure 3:
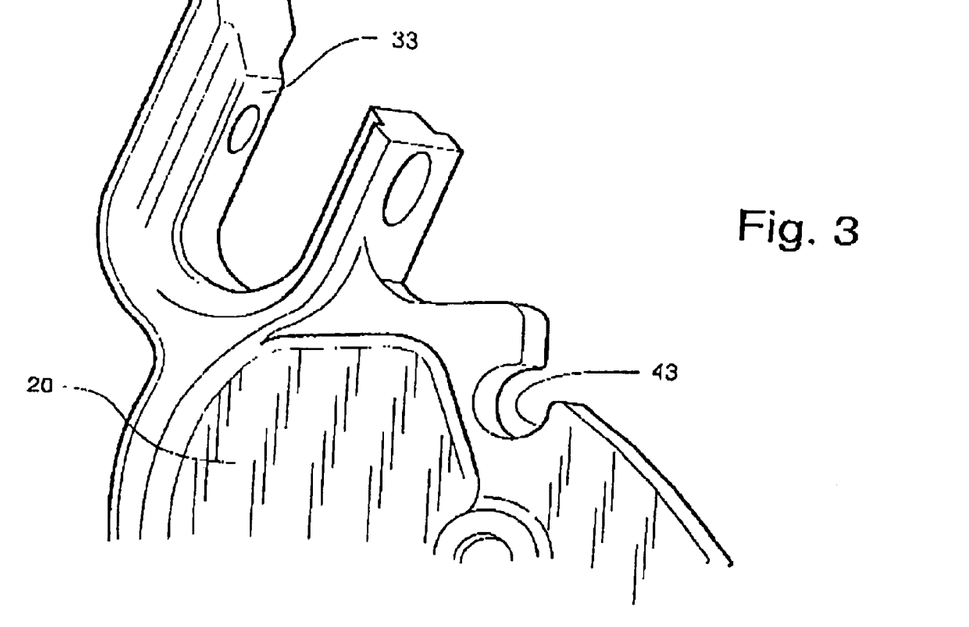
FIG. 3 is a fragmentary perspective view of the seat frame at the armrest attachment area.

Referring now to FIGS. 2 and 3, a seat frame 20 is shown. Seat frame 20 is integrated with the legs 18 and 19, by laterally extending beams, not shown, that fit in collars 21, 22, generally as shown in applicant's U.S. Pat. No. 4,229,040. Further explanation will be made with reference to armrest 15, it being understood that the armrests 15 and 16 are identical in all relevant respects. The outboard armrests 14 and 17 are not normally adapted for movement by the seat occupant, but may be provided with the invention according to the application for use by maintenance personnel. The armrest 15 is shown in its raised position, where it may be positioned by the passenger, or by maintenance personnel during installation or servicing procedures. Armrest 15 includes an armrest support 25 pivotally-mounted to seat frame 20 in a conventional manner. The armrest support 25 has an upper wall 26, opposed side walls 27, 28, and a lower wall 29 defining a void for carrying wiring and cabling therein towards a distal end of the armrest support 25, and an opening adjacent the proximal pivoting end of the armrest 15. Armrest 15 is pivotally attached to the seat frame by an arm bracket 32, see FIG. 9, which is mounted in a pivot channel 33 formed in the seat frame 20. This type of attachment is conventional.

An armrest pivot cover 40 is normally received in and covers the opening 30 of the armrest support 25. The armrest pivot cover 40 thus prevents inadvertent contact with the pivot area of the armrest 15. The armrest pivot cover 40 is also designed to guide and protect the wiring and cabling which extends from the seat frame 20 past the pivot area and into the armrest 15, as described below. The armrest pivot cover 40 is preferably a single, integrally-formed elastomeric molded element.

Referring now to FIGS. 4, 5, 6 and 7, the armrest pivot cover 40 includes a first pivot member in the form of a cylindrical male pivot 41 which fits into a female socket 43 formed in the seat frame 20 below the pivot channel 33. The range of pivotal movement of the pivot 41 relative to the seat frame 20 is approximately 60 degrees. This pivoting movement permits movement of the armrest pivot cover 40 in unison with the movement of the armrest 15. Compare FIGS. 1 and 2. Movement of the armrest pivot cover 40 relative to the armrest 15 is also permitted between a normally closed position covering the void in the armrest support, FIG. 4, and a partially-open position, FIG. 7.

Figure 7:
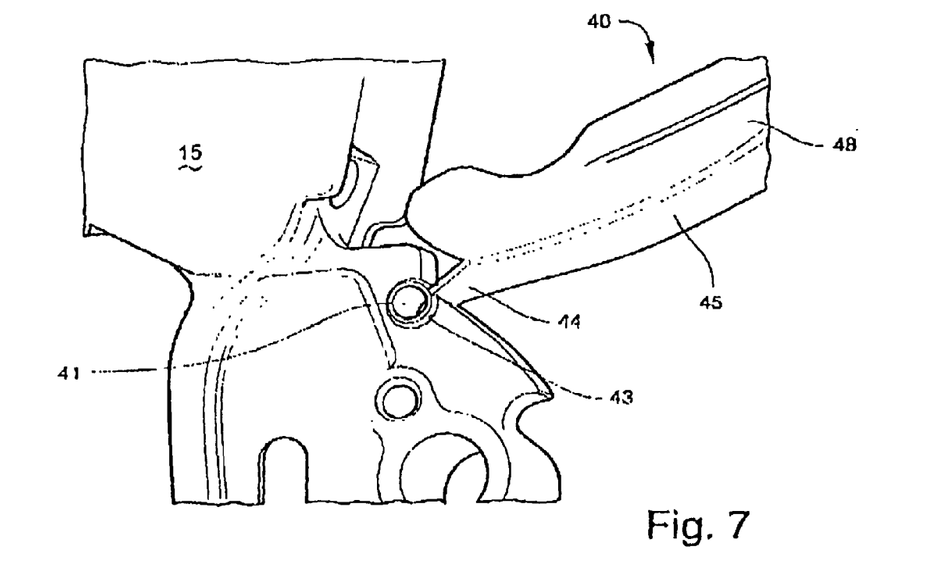
FIG. 7 is a fragmentary perspective view of the armrest pivot cover in an open position.

The pivot 41 is integrally-formed with a flexible hinge 44 thereby permitting further movement of the armrest pivot cover 40 past the partially-open position to a fully-open position thereby exposing fully the wiring for installation or service access. By providing an initial 60 degrees of pivotal movement when opening the armrest pivot cover 40, the amount of flex to which the elastomeric hinge 44 is exposed is substantially reduced. The angular travel of the armrest pivot cover 40 in excess of 60 degrees is seen through the material of the hinge 44 as a "living" hinge. This reduction in the amount of flex reduces material degradation due to fatigue and increases component life.

Figure 5:
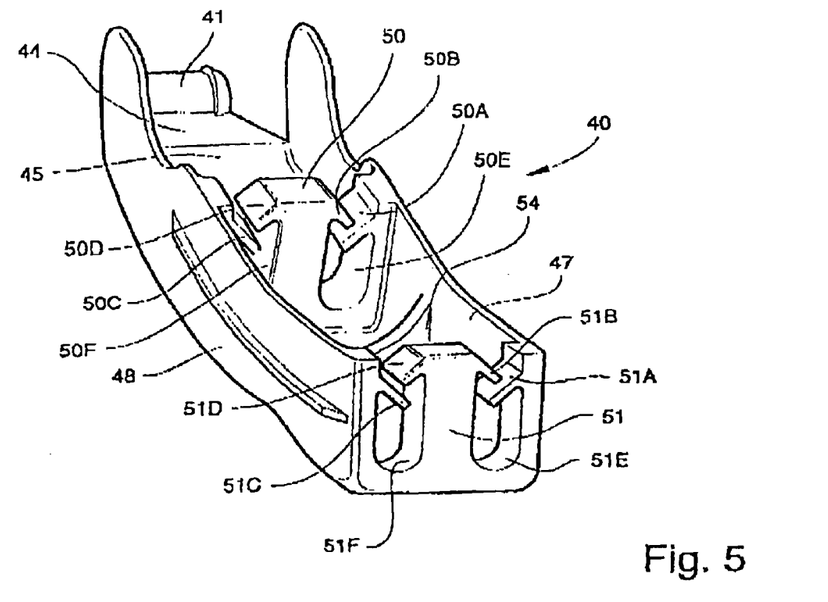
FIG. 5 is a perspective view of the armrest pivot cover.
Figure 6:
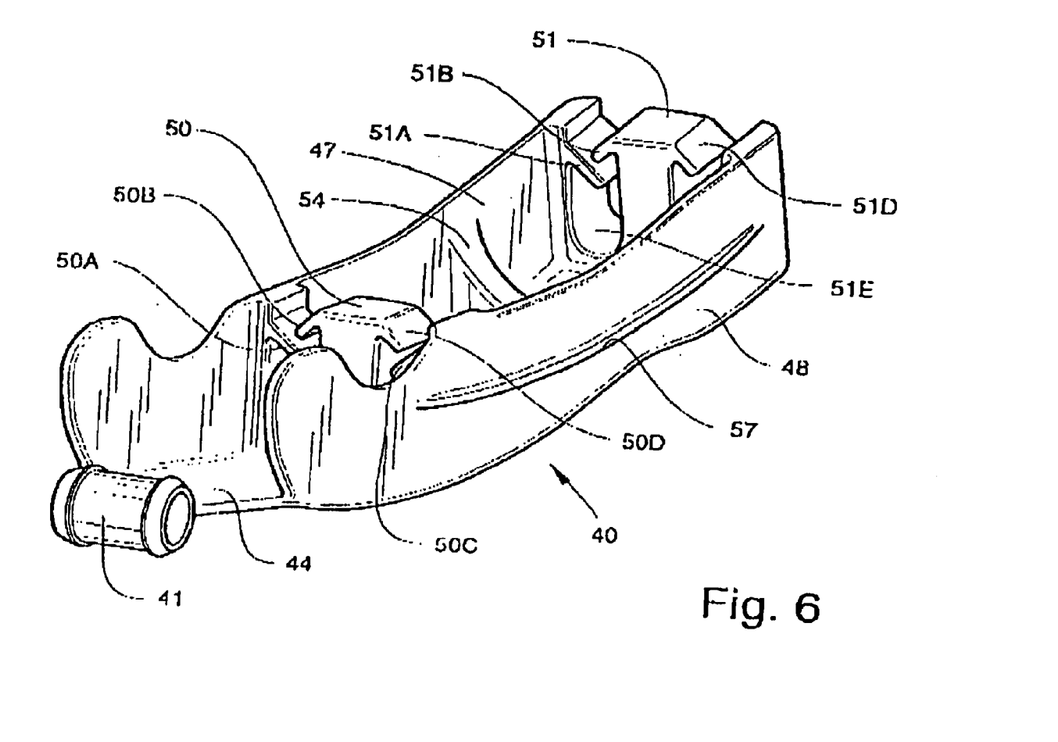
FIG. 6 is a perspective view of the armrest pivot cover from another angle.

As is best shown in FIGS. 5 and 6, the armrest pivot cover includes a bottom wall 45 and opposing side walls 47 and 48. The hinge 44 is integrally-formed with the bottom wall 45 and extends outwardly from an end of the bottom wall 45. A pair of one-way wire retainer posts 50 and 51 are provided for enabling unimpeded placement of wires and cables through the armrest pivot cover 40, while preventing inadvertent removal or displacement of the wires or cables. The retainer posts 50 and 51 support opposed pairs of vertically-offset, inwardly facing fingers 50A–D, 51A–D. Once past the fingers 50A–D, 51A–D, the wires and cables reside in a pair of U-shapes troughs 50E–F, 51E–F. Removal of the wires and cables must be accomplished by threading the wires and cables upwardly and past the inwardly extending fingers 50A–D, 51A–D.

As is best shown in FIGS. 5 and 6, a reenforcing web 54 is positioned between the retainer posts 50, 51 for providing lateral dimensional stability to the armrest pivot cover 40. Armrest pivot cover 40 also includes a pair of guide rails 57, one shown, which extend longitudinally along the opposing side walls 47, 48.

Figure 4:
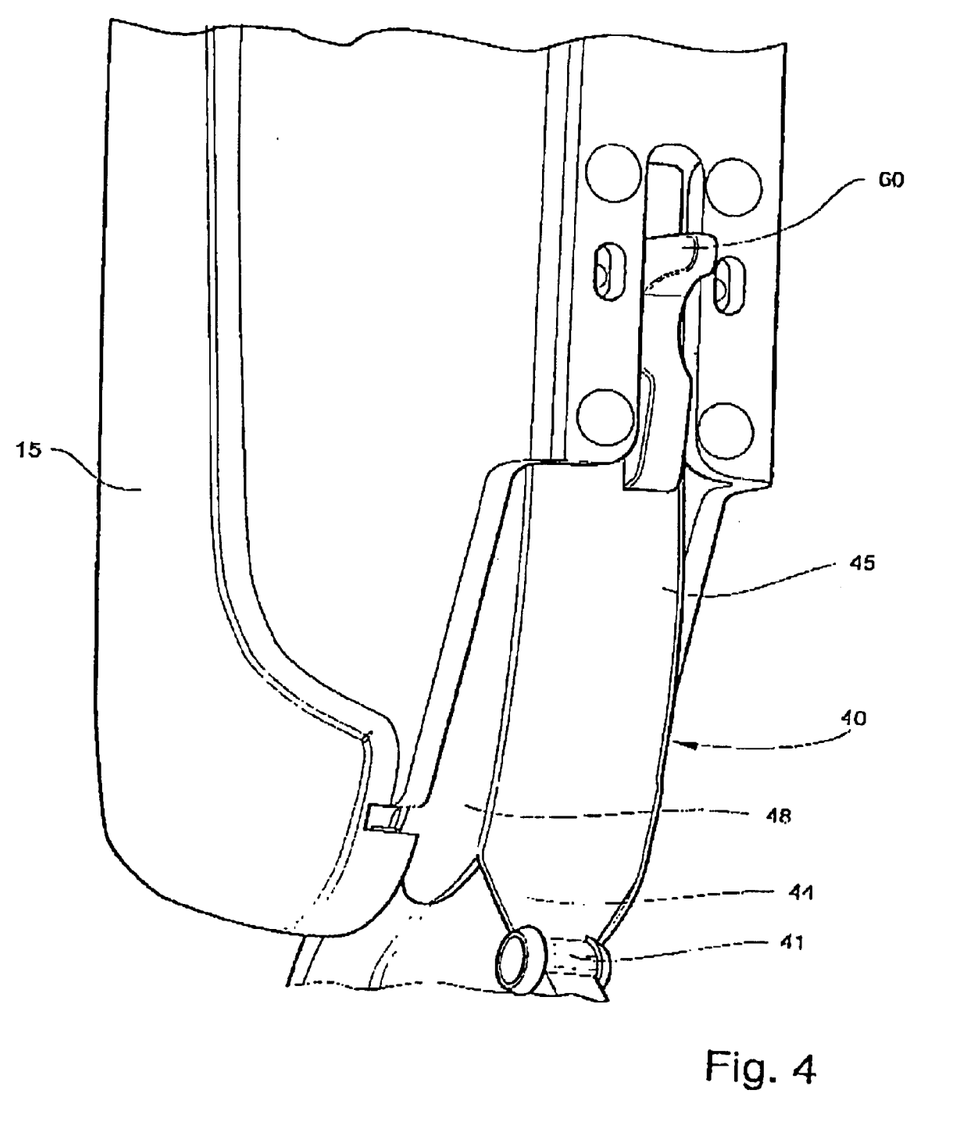
FIG. 4 is a fragmentary perspective view of the hinge area of the armrest and seat frame of FIG. 2.
Figures 8, 9:
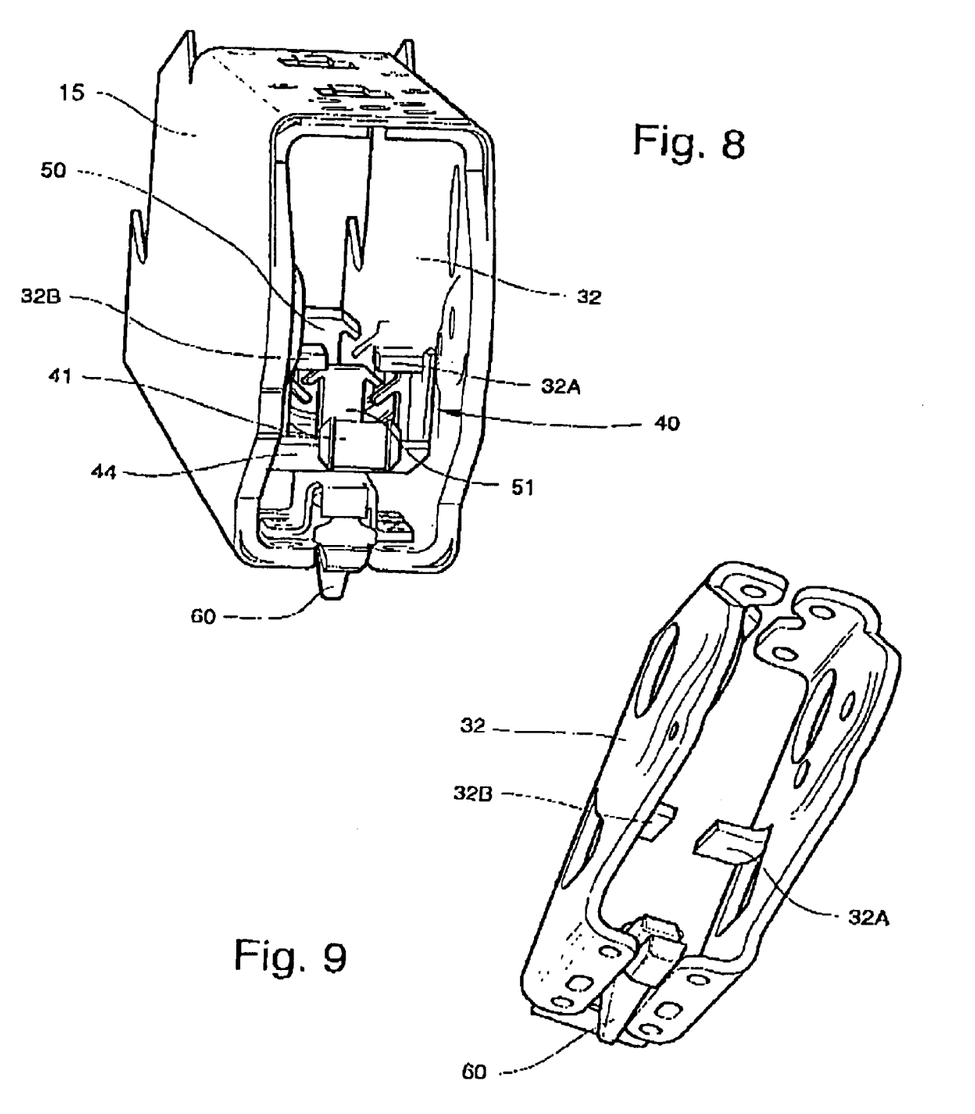
FIG. 8 is a fragmentary perspective view of a segment of the armrest with the armrest pivot cover mounted therein.
FIG. 9 is a perspective view of a segment of the armrest with the armrest pivot cover removed.

Referring now to FIGS. 4, 8 and 9, further details of the interface between the armrest 15 and the armrest pivot cover 40 are explained. The armrest pivot cover 40 fits into the gap formed between the bottom of armrest 15 and the pivot area of the seat frame 20. The armrest 15 itself is held on the seat frame 20 by a spring-loaded latch 60 mounted in the bottom of the arm bracket 32.

The armrest pivot cover 40 is received within the arm bracket 32 and maintained in a fixed position by a pair of tabs 32A, 32B formed in opposing side walls of the arm bracket 32. As shown in FIG. 7, the armrest pivot cover 40 can be pivoted downwardly away from the armrest 15 for access to any wiring or cabling in the armrest 15.

An armrest pivot cover for a passenger seat is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. An armrest for a passenger seat adapted for carrying electrical wires and seat position cables therein, said armrest comprising:
   (a) an armrest support for being pivotally-mounted by a proximal end thereof to a seat frame for movement between a lower position for supporting a seat occupant's arm and a raised position, said armrest support having an upper wall, opposed side walls, a lower wall defining a void for carrying wiring and cabling therein towards a distal end of the armrest support, and an opening adjacent the proximal pivoting end of the armrest for permitting access to an interior of the armrest support;
   (b) an armrest pivot cover for normally being received in and covering the opening of the armrest support adjacent the proximal pivoting end thereof to protect the wiring and cabling therein, said armrest pivot cover including:
      (i) a first pivot member carried adjacent a proximal end of the armrest pivot cover for providing a first predetermined range of pivotal movement relative to the armrest support between a normally closed position covering the void in the armrest support and a partially-open position;
      (ii) a hinge formed of a flexible material carried by and integral with the first-pivot member for permitting a second, further movement of the armrest pivot cover past the partially-open position to a fully-open position thereby exposing fully the wiring for installation or service access.

2. The armrest for a passenger seat according to claim 1, wherein said first pivot member comprises a male member having a circular periphery.

3. The armrest for a passenger seat according to claim 2, wherein said male member comprises a cylinder.

4. The armrest for a passenger seat according to claim 1, wherein the opposed side walls of the armrest support includes guide means formed on interior walls thereof for guiding the pivot cover into covering position in the opening of the armrest support.

5. The armrest for a passenger seal according to claim 4, wherein said guide means comprise first and second opposed guide tabs formed in respective opposed side wall and projecting into the void in a position to guide the armrest support onto the pivot cover.

6. The armrest for a passenger seat according to claim 1, and including wiring guide slots formed in the pivot cover for guiding wiring and cabling from the armrest support to the seat frame.

7. The armrest for a passenger seat according to claim 6, and including one-way wire retainers for allowing passage of wires or cables to pass unimpeded into the pivot cover but not unimpeded out of the pivot cover.

8. An armrest for a passenger seat adapted for carrying electrical wires and seat position cables therein, said armrest comprising:
   (a) an armrest support for being pivotably-mounted by a proximal end thereof to a seat frame for movement between a lower position for supporting a seat occupant's arm and a raised position, said armrest support having an upper wall, opposed side walls, a lower wail defining a void for carrying wiring and cabling therein towards a distal end of the armrest support, and an opening adjacent the proximal pivoting end of the armrest for permitting access to an the interior of the armrest support;
   (b) an armrest pivot cover for normally being received in and covering the opening of armrest support adjacent the proximal pivoting end thereof to protect the wiring and cabling therein, said armrest pivot cover including:
      (i) a cylindrical male pivot carried adjacent a proximal end of the armrest pivot cover for providing a first predetermined range of pivotal movement relative to the armrest support between a normally closed position covering the void in the armrest support and a partially-open position;
      (ii) an elastomeric hinge extending outwardly from the cylindrical male pivot for permitting a second, further movement of the armrest pivot cover past the partially-open position to a fully-open position thereby exposing fully the wiring for installation or service access.

9. The armrest for a passenger seat according to claim 8, wherein the opposed side walls of the armrest support includes guide means formed on interior walls thereof for guiding the pivot cover into covering position in the opening of the armrest support.

10. The armrest for a passenger seat according to claim 9, wherein said guide means comprise first and second opposed guide tabs formed in respective opposed side wall and projecting into the void in a position to guide the armrest support onto the pivot cover.

11. An armrest for a passenger seat according to claim 9, wherein said opposed side wails of the armrest support includes guide means formed on interior walls thereof for guiding the pivot cover into covering positron in the opening of the armrest support.

12. An armrest for a passenger seat according to claim 9, wherein said guide means comprise first and second opposed guide tabs formed in respective opposed side wall and projecting into the void in a position to guide the armrest support onto the pivot cover.

13. The armrest for a passenger seat according to claim 8, and including wiring guide slots formed in the pivot cover for guiding wiring and cabling from the armrest support to the seat frame.

14. The armrest for a passenger seat according to claim 8, and including one-way wire retainers for allowing passage of wires or cables to pass unimpeded into the pivot cover but not unimpeded out of the pivot cover.

15. A passenger seat having at least one armrest carrying electrical wires and seat position cables therein, said seat comprising:

(a) an armrest support for being pivotally-mounted by a proximal end thereof to a seat frame or the seat for movement between a lower position for supporting a seat occupant's arm and a raised position, said armrest support having an upper wall, opposed side walls, a lower wall defining a void for carrying wiring and cabling therein towards a distal end of the armrest support, and an opening adjacent the proximal pivoting end of the armrest for permitting access to an interior of the armrest support;

(b) an armrest pivot cover for normally being received in and covering the opening of the armrest support adjacent the proximal pivoting end thereof to protect the wiring and cabling therein, said armrest pivot cover including:

(i) a cylindrical male pivot carried adjacent a proximal end of the armrest pivot cover in mating relation to a complementary female socket pivot carried by the seat frame for providing a first predetermined range of pivotal movement relative to the armrest support between a normally closed position covering the void in the armrest support and a partially-open position;

(ii) an elastomeric hinge extending outwardly from the cylindrical male pivot for permitting a second, further movement of the armrest pivot cover past the partially-open position to a fully-open position thereby exposing fully the wiring for installation or service access.

16. The passenger seat according to claim 15, wherein said male member comprises a cylinder and said complementary female member comprises a socket.

17. The passenger seat according to claim 15, wherein the socket is integrally-formed in the seat frame.

18. The passenger seat according to claim 15, wherein said armrest support is removably mounted on said seat frame for sliding movement along a longitudinal axis thereof into and out of pivoting position on the seat frame.

19. A passenger seat according to claim 15, and including wiring guide slots formed in tho pivot cover for guiding wiring and cabling from the armrest support to the seat frame.

20. A passenger seat according to claim 15, and including one-way wire retainers for allowing passage of wires or cables to pass unimpeded into the pivot cover but not unimpeded out of the pivot cover.

21. A passenger seat according to claim 15, wherein said passenger seat is grouped with at least one similar passenger seat to form a seat set.

* * * * *

UNITED STATES PATENT AND TRADEMARK OFFICE
CERTIFICATE OF CORRECTION

PATENT NO.       : 6,776,455 B2
APPLICATION NO.  : 10/211087
DATED            : August 17, 2004
INVENTOR(S)      : Longtin, Scott et al.

Page 1 of 1

It is certified that error appears in the above-identified patent and that said Letters Patent is hereby corrected as shown below:

Column 6, line 34, delete "wail" and enter --wall--.

Column 6, line 38, delete "the"--.

Column 6, line 66, delete "An" and enter --The--

Column 6, line 67, delete "wails" and enter --walls--.

Column 7, line 2, delete "positron" and enter --position--.

Column 7, line 4, delete "An" and enter --The--.

Column 8, line 23, delete "A" and enter --The--.

Column 8, line 24, delete "tho" and enter --the--.

Column 8, line 27, delete "A" and enter --The--.

Signed and Sealed this

Twenty-second Day of August, 2006

JON W. DUDAS
*Director of the United States Patent and Trademark Office*